REVERTIVE CALLING PARTY LINE SYSTEM

Filed Jan. 14, 1947 2 SHEETS—SHEET 1

INVENTOR
ANDREW BROWN
BY R P Morris
ATTORNEY

Dec. 25, 1951 A. BROWN 2,579,469

REVERTIVE CALLING PARTY LINE SYSTEM

Filed Jan. 14, 1947 2 SHEETS—SHEET 2

INVENTOR
ANDREW BROWN
BY R.P. Morris
ATTORNEY

Patented Dec. 25, 1951 2,579,469

UNITED STATES PATENT OFFICE 2,579,469

REVERTIVE CALLING PARTY LINE SYSTEM

Andrew Brown, London, England, assignor to International Standard Electric Corporation, New York, N. Y., a corporation of Delaware Application January 14, 1947, Serial No. 721,990
In Great Britain March 24, 1939

Section 1, Public Law 690, August 8, 1946
Patent expires March 24, 1959

4 Claims. (Cl. 179—17)

Figure 1:
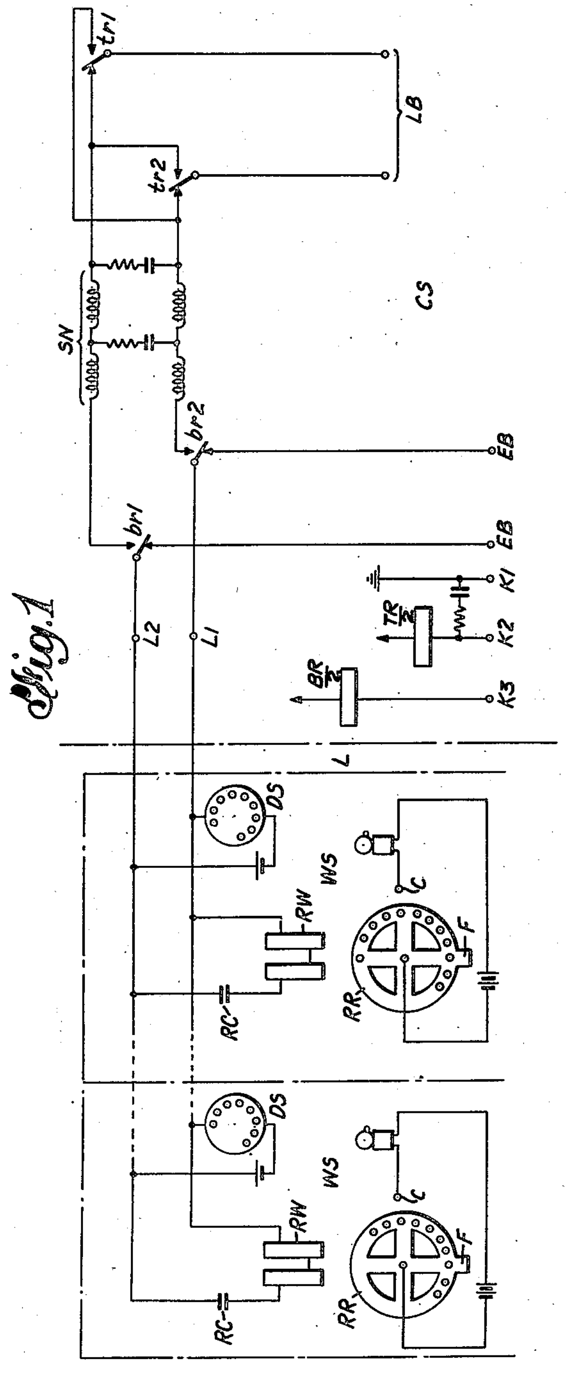

This invention relates to electric signalling systems having a number of stations on a common line.

The invention is characterised by the provision of signal regenerating equipment associated with the common line and arranged to transmit to the stations, in response to signals originated at a signal-transmitting position, signals of a constant wave-form which is independent of the wave-form of the signals received by the equipment. The signal-transmitting position may itself be in the common line or it may be outside of it.

Thus as applied to the so-called train-dispatching systems known in railway signalling and traffic control, in which a traffic controller at a main station can put out a call on a single two-wire system, to any one out of a large number of way stations scattered along the single line, the invention provides intercall facilities between the several stations on the common line. Again the invention can be used to provide selective ringing on a party-line circuit in a regular public telephone service.

Figure 3:
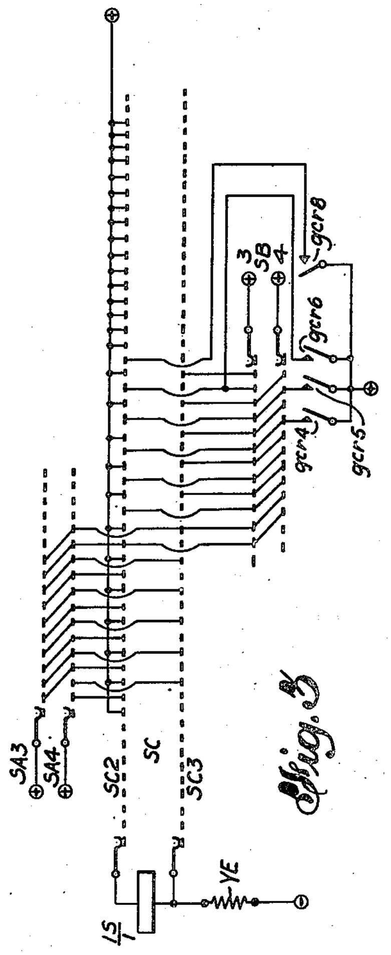
Figure 2:
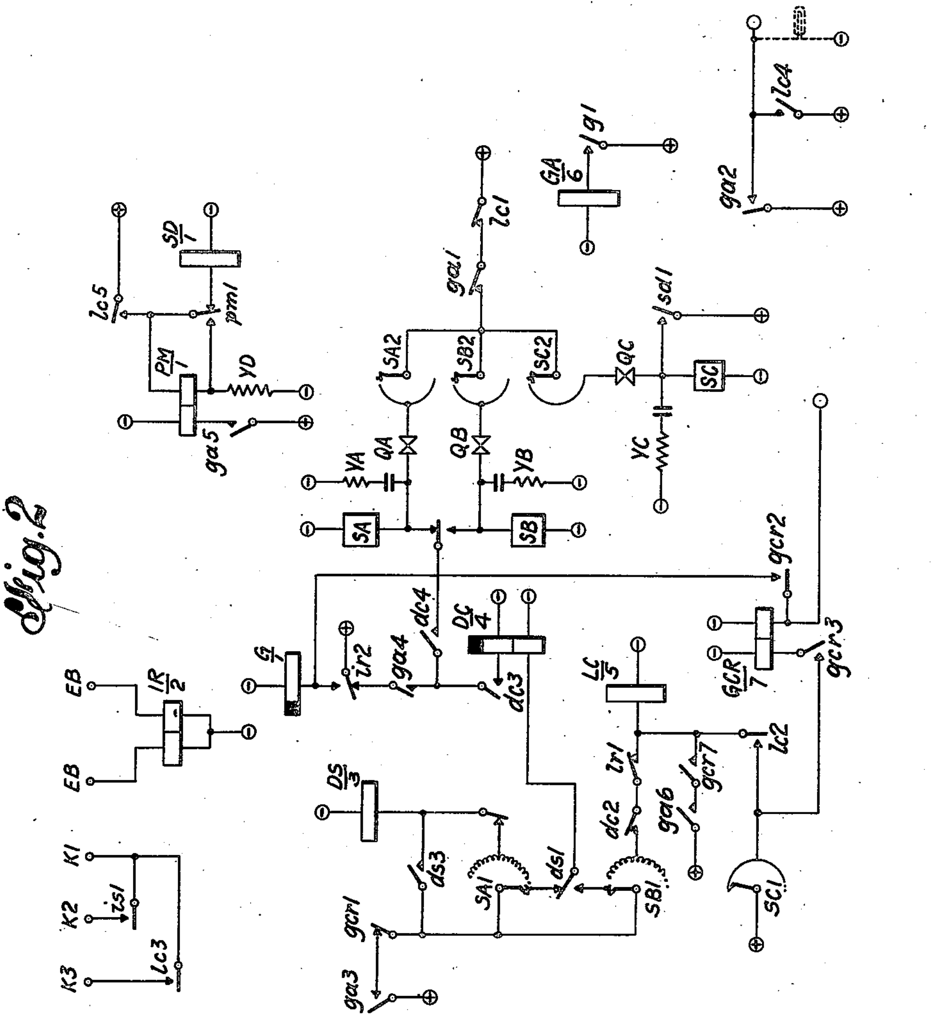

In order that the invention may be fully and clearly understood, a description will be given of one of its embodiments, as shown in the accompanying diagrammatic drawings. In the drawings:

Fig. 1 is a circuit diagram pertaining to a known telephone system having a controlling station and a number of way stations all on a single line; whilst Figs. 2 and 3 together show a circuit arrangement for inclusion at the controlling station, by means of which any way station may call any other way station without the necessity of intervention by an operator at the controlling station.

In Fig. 1 of the drawings is shown a common-line telephone system which except for the leads EB is of a known kind. The controlling station CS is connected to the several way stations WS by a single two-wire line L, which may, in the case of railway signalling, be some hundreds of miles in length. Describing briefly the operation of such a system, it may be said that the line battery LB at the controlling station CS is connected on to the line L when the battery relay BR is operated to close the contacts *br1* and *br2*. Selection of the desired way station WS from the controller is effected by a series of current pulses in the form of a wave-train of which each half-wave constitutes a pulse regardless of its polarity. This reversing wave train is created by the alternate operation and release of a telegraph relay TR of which the contacts *tr1* and *tr2* constitute a reversing switch between the line battery and the line. Before being sent out the calling current is passed through a smoothing network SN to modify the square wave-form so that no objectionably sharp clicks shall occur in the telephone receiver but merely dull thumps which are not disturbing.

It is a feature of the particular known system shown in the exemplary drawings that the impulse codes employed for calling various way stations are divided into three digits separated from one another by a steady line condition, and that the total number of impulses in the three digits is constant for all codes in any particular installation. The total usually employed is 17, which allows 78 independent codes to be connected in, when the minimum number in each digit is 2. This constant total feature makes the system exceptionally free from incorrect operation.

The receiving circuit at the way station employs a selector, shown diagrammatically in Fig. 1 of the drawings and which may be of the type commonly known as the gill selector described in the December 1926 issue of the Bell Laboratories Record on page 109, and manufactured by the Western Electric Company under type number selector 60-A. This selector is provided with a winding RW connected across the line L in series with a condenser RC for tuning the winding to the frequency of the impulses received, which may conveniently be 7 impulses, and hence 3½ cycles per second. A ratchet wheel RR takes one step for each pulse, regardless of the polarity, and is so devised that if a finger, positioned according to the code, is engaged when the ratchet comes to standstill after a single digit train, the ratchet wheel is there held, but otherwise is returned to normal. A second digit-train moves the ratchet in the same direction, either from the finger-hold position or from the normal, and at the conclusion of this train, if the number of impulses is appropriate, the ratchet wheel will again be held. Finally the third digit train, bringing the total number of impulses up to 17, will carry one ratchet wheel only out of all those on the line to a final position wherein a contact finger F will engage a stationary contact C and close a ringing circuit whereby ringing current is sent automatically through a bell at that particular station.

Provision may be made of course, for ringing all the way-stations in a general call, or for ringing certain groups of stations together, or for sending time signals to all. These features however, call for no special discussion here.

The present invention is concerned with giving to the way stations themselves the facility of calling any other way station on the common line, this being effected by transmitting a selecting signal from the calling way station to the controlling station, such as by means of a transmitting device generally indicated at DS, in one code, converting that signal into the three-digit constant-total code at the controller, and sending on the re-coded signal from the controller to the called station.

To this end is used the arrangement shown in Figs. 2 and 3 of the drawings, which is normally connected on to the line L through the back-contacts of *br1* and *br2*.

When any way station desires to originate a call, it must first listen on the line to see if it is free, then operate a dial key with which it is provided, and dial a two-digit code allotted to the way-station to be called. The dialling impulses are of the usual current-interruptive kind, so that the impulse receiving relay IR, responding to the code dialled, either by means of a simplex connection with earth return, as shown, or by means of loop impulsing in the well-known manner, will be energized immediately the dial key at any station is thrown. With relay IR energized, the slow releasing relay G is operated over contacts *ir2* and hence relay GA is operated over contacts *g1*; finally, relay DC is operated; positive, contacts *ga3*, *gcr1*, level 1 of line switch SA in the home position, contacts *ds1*, lower winding of DC, negative.

Upon receipt of the first dialling impulse relay IR releases, so that switch magnet SA is energized; positive, contacts *ir2*, *ga4*, *dc4*, *ds2*, winding of SA, negative. Also the upper winding of relay DC is energized in parallel with the switch magnet over contacts *dc3*.

When relay IR is re-operated at the end of the first impulse, switch magnet SA is de-energized and switch SA will take one step. With this step of switch SA away from the home position, the pre-energizing circuit for the relay DC is interrupted but thereafter the relay DC will hold on its upper winding for the duration of the one digit-train. The switch SA will take one step for each impulse in the first digit.

During the interdigital pause, relay IR will be in operation for a sufficiently long period to allow relay DC to release. Relay DS is then operated; positive, *ga3*, *gcr1*, level 1 of switch SA in any position other than home, contacts *dc1*, winding of relay DS, negative. Relay DS is then locked over contacts *ds3* independently of the subsequent operation of relay DC. Relay DC is re-operated on its pre-energizing winding over the home contact of switch SB, level 1 and contacts *ds1* operated.

When the second digit is dialled, relay IR responds, as before, and the impulses from contacts *ir2* are routed, over contacts *ds2*, to the magnet of switch SB, which, in a similar manner to switch SA, will take one step for each impulse in the second digit.

At the end of the second digit, relay IR is in operation for a comparatively long period and the relay DC consequently releases.

When the dial key at the calling way station is restored to normal, relay IR will be finally released; whereupon relay LC is operated; positive, contacts *ga3*, *gcr1*, level 1 of switch SB in any position other than home, contacts *dc2*, *ir1*, winding of LC, negative. Relay LC locks over contacts *lc2* and level 1 of switch C.

Relay PM is a special relay having a pendulum attached to its armature, which is adjusted to give a natural period of vibration of approximately 7 cycles per second, the known system already described with reference to Fig. 1 operating at a frequency of seven impulses, that is 3½ cycles per second.

During the reception of the two-digit code described above, one winding of PM is energized, over contacts *ga5*, so that the armature and pendulum are held operated to the full amplitude available. When relay GA releases after the final release of IR, the relay PM will be de-energized on its first winding, and since the second winding of PM is short circuited by the operated contacts *pm1*, the pendulum will be released. On releasing, the contacts *pm1* swing over to the back contact and relay SD is energized over contacts *lc5* and *pm1*. Winding of PM is re-energized over contacts *lc5* in series with resistance YD which connects with the negative pole of the current source, until the pendulum swings back, and contacts *pm1* again short circuit the winding of PM. The resistance YD is chosen so that the coil PM receives sufficient energy to maintain the vibration of the pendulum after the initial full swing imparted by the first winding of PM.

With each swing of the pendulum, relay SD is operated and released again. Contacts *sd1* operate switch magnet SC, so that the switch C is caused to step at a uniform speed of approximately 7 steps per second, and will continue to do so as long as relay LC remains operated.

The operation of contacts *lc3* connects terminals K1 and K3 together thus energising the battery relay BR (Fig. 1) and switching the line from the IR relay to the controlling station CS.

As the switch C steps, under control of the pendulum relay PM, relays IS (Fig. 3) will be operated in accordance with the connections made to levels 2 and 3 of the switch. For the first few steps, IS is not operated, allowing a preparatory period of approximately one second after the initial connection of the signalling battery to the line, but when switch C reaches its 10th step, relay IS is operated from positive, applied over level 2 of switch C. Thereafter, ignoring any positive connection via A or B, relay IS will be operated and released on alternate steps of switch C until IS has completed 25 reversals. At each operation of relay IS the telegraph relay TR is operated, to displace the line-battery reversing contacts *tr1* and *tr2*.

Switches SA and SB have been stepped in accordance with the first and second digits dialled, and these switches are now used to select the two inter-digital pauses in a three-digit code, so arranged that the total number of impulses in the three digits of each code is always 17.

The digits originally dialled at the calling way station represent the first and third digits of the normal three-digit controller-calling code, the second digit being inserted automatically to bring the total number of impulses to 17.

For example, assuming that the code dialled was 5:3, then referring to Fig. 3, when switch SC commences stepping, switch SA will already be standing on its 5th contact and switch SB on its 3rd contact.

Relay IS will be operated when switch SC reaches its 10th contact, released on the 11th, re-operated on the 12th, released on the 13th and re-operated on the 14th. When switch SC steps on to the 15th contact, however, relay IS will be held operated by positive supplied to the 15th contact over level 4 of switch A. IS remains operated on the 16th contact, and again on the 17th contact. On the 18th contact, relay IS also remains operated but releases on the 19th, to commence the second digit.

Thereafter IS operates and releases on alternate contacts until switch C steps on to the contact No. 28. At this point relay IS is about to operate, but is prevented from doing so by virtue of the positive connection applied over level 4 of switch B on its third step, this positive being connected over the 28th step on level 3 of switch C, to short-circuit relay IS, the ressistance YE being inserted to limit the short-circuit current.

On step No. 29, relay IS has no positive feed: on step 30 it is again short circuited by the positive applied over level 3 of switch B; on 31 there is no positive feed; on 32, IS is again operated; on 33, IS is released; and on 34 is re-operated for a relatively long period.

As stated, each operation of relay IS connects terminals K1 and K2 together, and in the controlling station equipment this has the effect of operating the telegraph relay TR which reverses the polarity of the battery fed on to the line L. It will be seen, therefore, that in the case above described, relay IS causes 5 impulses of alternating polarity to be sent over the line, then remains operated for a period corresponding to 5 impulses; thereafter IS transmits a further 9 alternating impulses, remains de-energised for a second interdigital pause equivalent to 5 impulses, and finally sends a third digit of three impulses; then remains energised for a relatively long period, say two seconds, during which time the way-station selector which is coded 593 will be standing in its ringing position, and subsequently the desired battery bell will ring for about two seconds.

As in the known system, on final release of IS a single impulse is sent over the line, which will restore the calling selector to normal.

When the switch SC, still stepping under the control of the pendulum relay PM, steps beyond the portion of its bank which is used for sending the three-digit constant-total code and ringing period, the relay LC will be released by level 1 of switch C, and the closing of contacts lc1 prepares a homing circuit for all three switches in conjunction with their homing arcs and interrupter contacts in the well-known manner.

In cases where an intercall system in accordance with the present invention is used in conjunction with a manual exchange, the operator on the manual exchange could conveniently be treated as a party on the line, and after making connection with the desired subscriber on the party line, would connect the party line to any other line on the manual exchange in the usual way.

Where such a system is used in conjunction with an automatic exchange, it is clear that in the case of calls from the exchange to the party line, the switches SA and SB could be positioned by the last two digits of a code dialled through the exchange, preliminary digits being dialled by the exchange subscriber to obtain access to the desired party line. In the case of calls from the party line to the exchange on the other hand, the subscriber on the party line would dial a special first digit which would step the switch SA a short way to a particular point on one of the switchbands. This condition would be used to set up a connection between the party line and an extension line on the exchange, and thereafter the originating subscriber on the party line would be treated in exactly the same way as any individual extension.

Where two or more intercall lines are used with interconnection facilities, it would be convenient to provide additional switchgear to receive a preliminary digit indicating the line for which a call was destined: each line would be provided with a separate code receiving and retransmitting unit similar to that described above, the code marking switches SA and SB being positioned by the dialled code received from the calling partly after the preliminary connection between the intercall lines had been established in response to a preliminary digit.

In the embodiment of the invention which has been described in detail above, it has been assumed that after dialling a two-digit code, the calling dial key would be restored to start up the transmission of the three-digit control code, but as an alternative, it might be convenient for the three-digit code to start up automatically on the completion of the second dialled digit and for the calling party's dial key to remain operated throughout the conversation, to hold the line busy from the point of view of exchange connection or interconnection with other party lines.

What is claimed is:

1. An automatic telephone system comprising a plurality of subscribers stations, a common line interconnecting said stations, means for calling a subscriber's station, said means including a transmitter at a calling subscriber's station for transmitting a selecting signal in a first impulse form, a centre station in said common line operable to receive said selecting signal, means at the centre station for converting said signal into a second impulse form, transmitting means at said centre station for retransmitting said converted signal over said common line in said second impulse form and means at said subscriber's stations selectively responsive to said retransmitted signal.

2. An automatic telephone system as claimed in claim 1 wherein the selecting signal transmitted by said calling subscriber's station is of a two-digit, constant-impulse-total form and the signal retransmitted by said centre station is of a three-digit, constant-total-current-reversive form and means at said centre station operative to store impulses of said first form until a complete signal has been received.

3. An automatic telephone system comprising a plurality of subsets, a common line connecting said subsets, means for selecting and calling any one subset from any other subset, said means comprising a transmitter at a calling subset for transmitting a selecting signal of a first impulse form to said common line, a centre-station in said common line, signal converting means at said centre station for converting the received signal into a second impulse form, transmitting means at said centre station responsive to said first signal operative to retransmit said converted signal over said common line in said second impulse form, and means at said subsets selectively responsive to said retransmitted signal to which a selective called subset is responsive.

4. An electric signalling system comprising a signal transmitting position, a plurality of subscribers stations, circuit means connecting said transmitting position and said plurality of stations, said transmitting position including means operative to transmit signals of a two-digit constant-impulse-total form to said circuit means, a signal regenerating device connected in said circuit means being operative to receive said impulse signals from said transmitting position, storage means in said regenerating device operative to store said impulse signals until a complete signal has been received and means in said regenerating device for converting said received signals into three-digit signals of constant-total-current-reversive impulses, said last-named means including means to transmit said regenerated impulses over said circuit means to a predetermined one of said plurality of stations.

ANDREW BROWN.

REFERENCES CITED

The following references are of record in the file of this patent:

UNITED STATES PATENTS

| Number | Name | Date |
|---|---|---|
| 1,831,730 | Ahlberg | Nov. 10, 1931 |
| 2,020,953 | McClew | Nov. 12, 1935 |
| 2,046,964 | Nelson | July 7, 1936 |
| 2,141,237 | Connery | Dec. 27, 1938 |
| 2,148,915 | Trechcinski | Feb. 28, 1939 |
| 2,187,186 | Wallace | Jan. 16, 1940 |
| 2,203,755 | Topfer | June 11, 1940 |
| 2,335,473 | Bakker | Nov. 30, 1943 |